Patented June 20, 1939

2,163,073

UNITED STATES PATENT OFFICE 2,163,073

AZO DYESTUFFS INSOLUBLE IN WATER AND FIBER DYED THEREWITH

Erwin Thoma, Frankfort-on-the-Main-Hochst, and Wilhelm Seidenfaden, Offenbach-on-the-Main, Germany, assignors to General Aniline Works, Inc., New York, N. Y., a corporation of Delaware No Drawing. Application March 23, 1937, Serial No. 132,632. In Germany April 2, 1936

10 Claims. (Cl. 260—188)

The present invention relates to azo-dyestuffs insoluble in water and to fiber dyed therewith, more particularly it relates to dyestuffs of the following general formula:

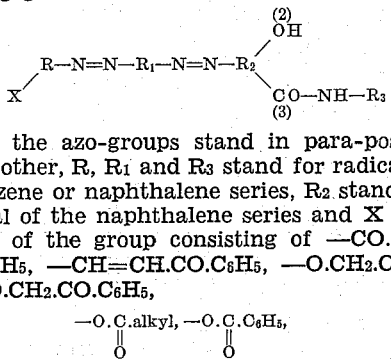

wherein the azo-groups stand in para-position to each other, R, $R_1$ and $R_3$ stand for radicals of the benzene or naphthalene series, $R_2$ stands for a radical of the naphthalene series and X for a member of the group consisting of —CO.alkyl, —CO.$C_6H_5$, —CH=CH.CO.$C_6H_5$, —O.$CH_2$.CO.alkyl, —O.$CH_2$.CO.$C_6H_5$, —O.C.alkyl, —O.C.$C_6H_5$,
  ‖        ‖
  O         O —COO.alkyl, —COO.$C_6H_5$, —$CH_2$.COO.alkyl, —CH=CH.COO.alkyl, $CH_2$—$CH_2$
      /        \
—CO.N          $CH_2$,
      \        /
       $CH_2$—$CH_2$ —$CH_2$.CO.N(alkyl)$_2$, —O—$CH_2$.CO.N(alkyl)$_2$, —CH=CH.CO.N(alkyl)$_2$, CO.alkyl        COH         CO.alkyl
   /               /            /
—N          , —N        ,   —N           ,
   \               \            \
    alkyl           alkyl        $CH_2$.$C_6H_5$ alkyl
         /
      —N           ,
         \
          CO.$C_6H_5$ —$SO_2$.alkyl, —$SO_2$.$C_6H_5$, —$SO_2$.$CH_2$.$C_3H_5$, —$CH_2$.$SO_2$.alkyl, —$CH_2$.$SO_2$.$C_6H_5$, —$SO_2$.O.$C_6H_5$, —O.$SO_2C_6H_5$, —$CH_2$.$SO_2$.N(alkyl)$_2$, alkyl            alkyl
     /                /
  —N        and   —N
     \                \
      $SO_2$.alkyl      $SO_2$.$C_6H_5$ We have found that valuable water-insoluble azo-dyestuffs are obtainable by coupling an arylide of an ortho-hydroxyarylcarboxylic acid or beta-ketocarboxylic acid with a diazo-compound of a para-aminoazo-compound of the benzene or naphthalene series which contains as a substituent at least one group containing the radical: —CO— or —$SO_2$— which on the one hand is connected with a hydrocarbon radical directly or through an oxygen bridge or through a nitrogen bridge having as a substituent at the third bond a hydrocarbon radical, and on the other hand is connected with the benzene or naphthalene radical of the para-aminoazo-compound directly or through an oxygen bridge and/or through a hydrocarbon bridge or through a nitrogen bridge containing as a substituent at the third bond a hydrocarbon radical; the dyestuff components must not contain any group which lends solubility, for instance a sulfonic acid or carboxylic acid group. The dyestuffs may be made in substance, on a fiber or on a substratum adapted for the production of lakes.

The para-aminoazo-compounds of the benzene or naphthalene series used as diazo-components may contain substituents of the following kind:—

—CO.alkyl, —CO.$C_6H_5$, —CH=CH.CO.$C_6H_5$, —O.$CH_2$.CO.alkyl, —O.$CH_2$.CO.$C_6H_5$, —O.C.alkyl, —O.C.$C_6H_5$,
  ‖        ‖
  O         O —COO.alkyl, —COO.$C_6H_5$, —$CH_2$.COO.alkyl, —CH=CH.COO.alkyl, $CH_2$—$CH_2$
      /        \
—CO.N          $CH_2$,
      \        /
       $CH_2$—$CH_2$ —$CH_2$.CO.N(alkyl)$_2$, —O—$CH_2$.CO.N(alkyl)$_2$, —CH=CH.CO.N(alkyl)$_2$, CO.alkyl      COH         CO.alkyl          alkyl
   /             /            /                /
—N        , —N        ,   —N           ,   —N          ,
   \             \            \                \
    alkyl         alkyl        $CH_2$.$C_6H_5$    CO.$C_6H_5$ —$SO_2$.alkyl, —$SO_2$.$C_6H_5$, —$SO_2$.$CH_2$.$C_6H_5$, —$CH_2$.$SO_2$.alkyl, —$CH_2$.$SO_2$.$C_6H_5$, —$SO_2$.O.$C_6H_5$, —O.$SO_2$.$C_6H_5$, —$CH_2$.$SO_2$.N(alkyl)$_2$, alkyl              alkyl
     /                  /
  —N        and     —N
     \                  \
      $SO_2$.alkyl        $SO_2$.$C_6H_5$ The diazonium compounds, for example the diazonium chlorides and the zinc-chloride double salts of these chlorides are in part easily soluble so that in making the dyestuffs in substance no large dilution is necessary, and in producing the dyestuff on the fiber in printing a material concentrated printing pastes are obtainable. In producing the dyestuff on yarn there may be added to the diazo-salt solution a salt, as is the case with the diazotized amines of the benzene series. Furthermore, in the case of the diazonium compounds of the aforesaid kind, there is frequently to be noticed the property, important for the making of the dyestuffs, that the mineral acid diazo-salt solutions are little sensitive to the addition of buffer agents, as for example sodium acetate. This very favorable property makes it possible, after the production of the dyestuff, to wash out easily non-coupled portions of diazonium salt. Many combinations do not bleed yellow in the washing sample and thus do not show a defect which is frequently to be observed in the combinations from diazotized 4-aminoazo-compounds which are frequently used in practice. Other combinations are of high fastness to light.

The new dyestuffs are of very various tints. Thus, by using arylides of beta-ketocarboxylic acids, there are obtained on the fiber orange-yellow, orange-red, orange-brown, scarlet, bluish-red, bordeaux-red and brown-red tints which in part cannot be obtained with the already known para-aminoazo-compounds. With the arylides of ortho-hydroxy-carbazole-carboxylic acids there may be obtained for example, currant tints of high fastness to light. Further, fine black tints are obtained which in part are essentially faster to light than the dyeings obtainable from known para-aminoazo-compounds. By using 2,3-hydroxynaphthoic acid-arylides, there are obtained, for example bordeaux, currant, garnet, navy blue and greenish-blue, blue-black, black-violet and deep grey tints which in many cases are distinguished by a high fastness to light and good fastness to washing and chlorine.

The color tints are profoundly dependent, apart from the kind of coupling component, on the kind of the aforesaid substituents and on the position which they have in the para-aminoazo body of the benzene or naphthalene series. Further, the presence of other substituents such as alkyl-, alkoxy- or nitro-groups and halogen is of importance.

The following examples serve to illustrate the invention, but they are not intended to limit it thereto:

1. 50 grams of cotton yarn are treated with 1 liter of an alkaline grounding solution which contains 2.5 grams of the arylide of the following constitution:

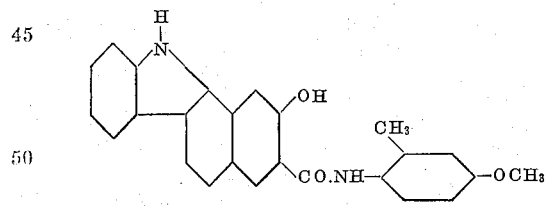

The grounded yarn is developed in a solution containing per liter 4 grams of 2,5-dimethoxy-2'-N-phenyl-sulfonyl-methyl-aminoazobenzene-4-diazonium-chloride, 0.8 gram of glacial acetic acid and 15 grams of sodium sulfate. After soaping in a bath containing per liter 3 grams of soap and 1 gram of sodium carbonate, there is obtained a black of very good fastness to light.

If the grounded cotton is developed with a diazo-solution from 3.6 grams of 2,5-dimethoxy-2'-carboxylic acid-diethylamide-4-aminoazobenzene, there is also obtained a black of very good fastness to light.

If for developing the dyestuff there is used a diazo-solution from 4-grams of 2,5-2'-trimethoxy-5'-carboxylic acid-diethylamide - 4 - aminoazobenzene made by diazotizing the base in 4 cc. of hydrochloric acid of 30 per cent. strength and water by means of 0.7 gram of sodium nitrite and making up the solution to 1 liter by addition of 40 grams of sodium chloride, 4 grams of sodium acetate and 0.7 gram of sodium bicarbonate, there is obtained a black fast to light.

If the diazo-compound from 4-amino-2-methoxy-5-methyl-4'-carboxylic acid-diethyl-amide-azobenzene or from 4-amino-2-methoxy-5-methyl-2'-carboxylic acid-diethylamide-azobenzene is used there is also obtained a valuable black.

By using as coupling component an arylide of the following constitution:

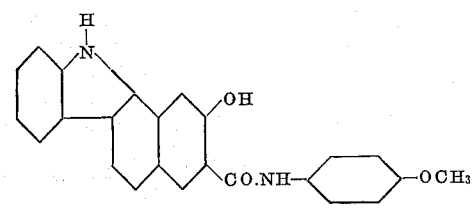

there are obtained valuable black tints with the diazo-compounds from: 4-amino-2,5-dimethoxy-4'-N-methylphenylsulfonylaminoazobenzene, 4-amino-3-methoxy-3'-carboxylic acid-diethylamide-azobenzene, or 4-amino-2,5-dimethoxy-2'-phenylsulfonylmethyl-azobenzene.

2. 50 grams of cotton yarn are treated in one liter of an alkaline grounding solution which contains 1.8 grams of 1-(2'-hydroxy-3'-carbazole-carbonylamino)-4-chlorobenzene. The grounded yarn is developed with a solution of 4 grams of the zinc-chloride double salt of 2,5-dimethoxy-3'-acetylazobenzene-4-diazonium-chloride, 0.6 gram of glacial acetic acid and 20 grams of sodium sulfate per liter. After soaping with 3 grams of soap and 1 gram of sodium carbonate per liter, there is obtained a violet-brown fast to light.

If the development is conducted with a diazo-solution from 3.6 grams of 2,5-dimethoxy-2'-carboxylic acid-diethylamide-4-aminoazobenzene, a violet of good fastness to light is obtained. By using the 2-methyl-5-methoxy-4'-carboxylic acid-diethylamide-4-aminoazobenzene as the diazo-component, a currant tint is obtained. With the diazo-compounds from 4-amino-2,5-dimethoxy-2'-carboxylic acid-diethylamide-azobenzene or from 4-amino-2,5-diethoxy-4'-phenylsulfonylmethyl-azobenzene there are obtained covered violet tints.

3. A mercerised calico is grounded with a padding solution which contains per liter 15 grams of 4,4'-di-(aceto-acetylamino)-3,3'-dimethyldiphenyl. It is then printed with a diazo solution from 18 grams of 2,5-dimethoxy-2,5'-bis-(carboxylic acid-diethylamide)-4-aminoazobenzene, 14 cc. of hydrochloric acid of 30 per cent. strength, 3 grams of sodium nitrite and 6 grams of sodium acetate, the whole having been made up to 500 cc. and then made up to 1 liter by addition of a thickening agent. After drying, the material is handled in a solution of 10 grams of sodium carbonate per liter at 90° C., rinsed, soaped at the boil and rinsed. There is obtained a scarlet-red.

When one uses as diazo-component 4-amino-2,5-dimethoxy-4'-acetylazobenzene, there is obtained a medium red; with 4-amino-2,5-dimethoxy-3',4'-bis-(carboxylic acid-ethylester)-azobenzene, there is also obtained a middle red; with 4-amino-2,5-diethoxy-2'-carboxylic acid-ethylester-4'-nitro-azobenzene, there is obtained a dark red-brown; with 4-amino-2,5-dimethoxy-2'-methylsulfonyl-4'-nitro-azobenzene, there is obtained a reddish black-brown.

4. Bleached cotton piece goods are grounded on a foulard in a solution which contains per liter

| | | |
|---|---|---|
| 1-(2′,3′-hydroxynaphthoylamino)-benzene | grams | 15 |
| Caustic soda solution of 34° Bé | cc | 22.5 |
| Turkey-red oil | cc | 15 | and dried. On the goods thus grounded there is printed a paste which contains

| | | |
|---|---|---|
| 2,5-dimethoxy-4′-nitro-azobenzene-2′-carboxylic acid-ethylester-4-diazonium-chloride | grams | 20 |
| Acetic acid of 50 per cent strength | do | 50 |
| Water | do | 430 |
| Starch tragacanth thickening | do | 500 |
| | Grams | 1000 |

After drying the material is passed through a hot sodium carbonate solution (containing 2 grams of anhydrous sodium carbonate per liter) and soaped at boiling temperature. There is obtained a deep black of very good fastness to light. The dyestuff corresponds with the following formula:

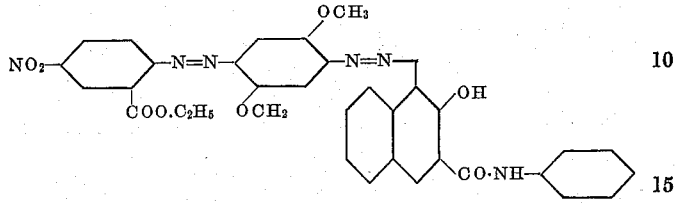

5. Also on cellulose esters and -ethers there may be obtained valuable dyeings with a series of para-amino-azo-compounds of the composition indicated above, if the operation is conducted as described in German Patent No. 637,317. Thus, acetate silk yarn may be impregnated, for instance, with 4-amino-2,5-dimethoxy-4′-N-acetyl-methylamino-azobenzene and 1-(2′,3′-hydroxynaphthoylamino)-benzene in the presence of guanidine and the dyeing may be developed by treatment with an acidified sodium nitrite bath. There is obtained a dark blue.

The following table illustrates a number of further azo-dyestuffs obtainable according to the present invention:

| Diazo component | Coupling component | Shade |
|---|---|---|
| 4-amino-2-carboxylic acid-diethylamide-4′-methoxyazobenzene | 1-(2′,3′-hydroxynaphthoylamino)-benzene | Bordeaux. |
| 4-amino-2-carboxylic acid-diethylamide-2′-methyl-4′-methoxyazobenzene | -2,5-dimethoxybenzene | Do. |
| 4-amino-2-N-phenylsulfonyl-methylamine-5-methoxy-4′-nitroazobenzene | -2-methyl-4-methoxybenzene | Very deep currant. |
| 4-amino-3-methoxy-3′-carboxylic acid diethylamide-azobenzene | do | Garnet. |
| Do | -2,4-dimethoxy-5-chlorobenzene | Do. |
| 4-amino-2-methyl-5-methoxy-3′-carboxylic acid diethylamideazobenzene | -2,5-dimethoxy-4-chlorobenzene | Currant. |
| 4-amino-2-methoxy-5-methyl-2′-carboxylic acid-diethylamideazobenzene | -naphthalene | Dark blue. |
| 4-amino-2-methoxy-5-methyl-3′-carboxylic acid-diethyl amide-azobenzene | -2,4-dimethoxy-5-chlorobenzene | Currant. |
| 4-amino-2-methoxy-5-methyl-4′-carboxylic acid-diethylamide-azobenzene | -2,5-dimethoxy-4-chlorobenzene | Dark currant. |
| Do | -2,4-dimethoxybenzene | Currant. |
| Do | -2,4-dimethoxy-5-chlorobenzene | Do. |
| 4-amino-2,5-dimethoxy-2′-acetyl-azobenzene | do | Dull currant. |
| 4-amino-2,5-dimethoxy-3′-acetyl-azobenzene | -4-methoxybenzene | Deep currant. |
| 4-amino-2,5-dimethoxy-4′-acetyl-azobenzene | -2,5-dimethoxybenzene | Reddish dull blue. |
| 4-amino-2,5-dimethoxy-4′-acetyl-2′-methoxy-azobenzene | -2-methyl-4-chlorobenzene | Do. |
| 4-amino-2,5-dimethoxy-4′-benzoyl-azobenzene | -2,4-dimethoxy-5-chlorobenzene | Blue-black. |
| 4-amino-2,5-dimethoxy-2′-carboxylic acid methylester-azobenzene | -4-chlorobenzene | Very reddish dull blue. |
| 4-amino-2,5-dimethoxy-4′-carboxylic acid-ethylester-azobenzene | -2-methylbenzene | Dull blue. |
| 4-amino-2,5-dimethoxy-2′-carboxylic acid-diethylamide-azobenzene | -4-chlorobenzene | Blue-black. |
| Do | -2,4-dimethoxy-5-chlorobenzene | Reddish dark blue. |
| 4-amino-2,5-dimethoxy-3′-carboxylic acid-diethylamide-azobenzene | -4-methoxybenzene | Very reddish dark blue. |
| 4-amino-2,5-dimethoxy-4′-carboxylic acid-diethylamide-azobenzene | -2,4-dimethoxy-5-chlorobenzene | Reddish blue-black. |
| 4-amino-2,5-dimethoxy-3′-carboxylic acid-N-methylanilide-azobenzene | -2,5-dimethoxy-4-chlorobenzene | Very reddish blue. |
| 4-amino-2,5-dimethoxy-2′,5′-bis-(carboxylic acid-diethylamide)-azobenzene | -benzene | Reddish blue. |
| 4-amino-2,5-dimethoxy-2′-carboxylic acid-piperidide-4′-nitro-azobenzene | do | Greenish dull blue. |
| Do | -2-methylbenzene | Black. |
| Do | -3-methyl-4-methoxy-benzene | Do. |
| 4-amino-2,5-dimethoxy-4′-N-acetylmethylamino-azobenzene | -2-methyl-4-methoxy-benzene | Dark blue. |
| Do | -2,5-dimethoxy-4-chlorobenzene | Do. |
| 4-amino-2,5-dimethoxy-3′-methoxy-6′-methoxy-azobenzene | -naphthalene | Blue-black. |
| 4-amino-2,5-dimethoxy-2′-phenylsulfonyl-azobenzene | -benzene | Deep blue. |
| 4-amino-2,5-dimethoxy-3′-sulfonic acid-phenylester-azobenzene | do | Black-violet. |
| 4-amino-2,5-dimethoxy-3′-sulfonic acid-diethylamide-azobenzene | -2,4-dimethoxy-5-chlorobenzene | Do. |
| 4-amino-2,5-dimethoxy-3′-sulfonic acid diethylamide-6′-methoxy-azobenzene | -2-methyl-4-chlorobenzene | Dull blue. |
| 4-amino-2,5-dimethoxy-2′-N-ethylsulfonyl-methylamine-azobenzene | do | Black-violet. |
| 4-amino-2,5-dimethoxy-2′-N-phenylsulfonyl-methylamine-azobenzene | -2,4-dimethoxy-5-chlorobenzene | Blue-black. |
| 4-amino-2,5-dimethoxy-3′-N-phenylsulfonylmethylamine-azobenzene | -benzene | Very reddish dark blue. |
| 4-amino-2,5-dimethoxy-2′-N-phenylsulfonyl-methylamine-5′-methoxy-azo-benzene | -2,5-dimethoxy-4-chlorobenzene | Dark blue. |
| 4-amino-2,5-dimethoxy-3′-N-phenyl-sulfonylmethylamine-4′-methoxy-azobenzene | -4-chlorobenzene | Blue-black. |
| 4-amino-2,5-dimethoxy-3′-N-phenylsulfonylmethylamine-6′-methoxy-azobenzene | 2,4-dimethoxy-5-chlorobenzene | Do. |
| 4-amino-2,5-dimethoxy-4′-N-phenylsulfonylmethylamine-3′-methoxy-azobenzene | -2-methyl-4-chlorobenzene | Do. |
| 4-amino-2,5-dimethoxy-4′-N-phenylsulfonyl-methylamine-azobenzene | 2-(2′,3′-hydroxynaphthoylamino)-naphthalene | Black. |

| Diazo component | Coupling component | Shade |
|---|---|---|
| 4-amino-2, 5-dimethoxy-4'-phenylsulfonyl-methyl-azobenzene | 2-(2',3'-hydroxynaphthoylamino)-naphthalene | Blue-black. |
| Do | 1-(2',3'-hydroxynaphthoylamino)-2, 4-dimethoxy-5-chlorobenzene | Dark blue. |
| Do | -2, 5-dimethoxy-4-chlorobenzene | Violet. |
| 4-amino-2, 5-dimethoxy-3'-phenylsulfonyl-oxy-azobenzene | do | Reddish dark blue. |
| Do | -2-methoxybenzene | Do. |
| 4-amino-2, 5-dimethoxy-4'-acetyl-oxy-azobenzene | -2, 5-dimethoxy-4-chlorobenzene | Do. |
| Do | -2-methylbenzene | Dark blue. |
| 4-amino-1-(ortho-carboxylic acid diethylamide-phenylazo)-naphthalene | | |
| 4-amino-1-(meta-carboxylic acid diethylamide-phenylazo)-naphthalene | -3-nitrobenzene | Very reddish dark blue. |
| 4-amino-1-(para-carboxylic acid diethylamide-phenylazo)-naphthalene | -2, 5-dimethoxy-4-chlorobenzene | Do. |
| 4-amino-2-methoxy-5-methyl-3'-sulfonic acid-phenylester-azobenzene | -2, 4-dimethoxy-5-chlorobenzene | Currant. |
| 4-amino-2-methyl-5-methoxy-2'-benzoyl-4'-nitro-azobenzene | -2, 4-dimethoxy-benzene | Reddish blue-black. |
| Do | -6'-bromo-2,4-dimethoxy-benzene | Reddish black. |
| 4-amino-2-methyl-5-methoxy-2'-nitro-4'-carboxylic acid-ethylester-azobenzene | -2-methylbenzene | Currant black. |
| Do | -2-methoxybenzene | Do. |
| Do | -4-chlorobenzene | Do. |
| 4-amino-2-methyl-5-methoxy-4'-N-acetyl-methylamino-azobenzene | -2, 4-dimethoxy-5-chlorobenzene | Bordeaux. |
| 4-amino-2-methyl-5-methoxy-2'-methyl-sulfonyl-4'-nitro-azobenzene | -2-methyl-4-methoxybenzene | Black-blue. |
| Do | -6'-bromo-2, 4-dimethoxy-benzene | Blue-black. |
| 4-amino-2-methyl-5-methoxy-2'-nitro-4'-methyl-sulfonyl-azo-benzene | -benzene | Currant. |
| 4-amino-2-methyl-5-methoxy-3'-sulfonic acid-phenyl-ester-azobenzene | -2, 5-dimethoxy-4-chlorobenzene | Deep currant. |
| 4-amino-2-methyl-5-ethoxy-2'-benzoyl-4'-nitro-azobenzene | 2-methyl-4-methoxy-benzene | Black. |
| Do | -6'-bromo-2, 4-dimethoxy-benzene | Reddish black. |
| 4-amino-2-methyl-5-ethoxy-2'-methyl-sulfonyl-4'-nitro-azobenzene | do | Black. |
| 4-amino-2-methoxy-5-methyl-4'-N-methyl-acetylamino-azobenzene | 2,5-dimethoxy-4-chlorobenzene | Currant. |
| 4-amino-2,5-dimethoxy-2'-benzoyl-4'-nitro-azobenzene | -2-methoxybenzene | Black. |
| 4-amino-2,5-dimethoxy-4'-benzoyl-ethylenyl-azobenzene | -benzene | Currant. |
| 4-amino-2,5-dimethoxy-2',5'-dicarboxylic acid ethylester-azobenzene | -2,5-dimethoxy-4-chlorobenzene | Reddish violet. |
| 4-amino-2,5-dimethoxy-3'-carboxylic acid-ethyl-ester-ethylenyl-azobenzene | -2-methylbenzene | Reddish dark blue. |
| Do | -2,5-dimethoxy-4-chlorobenzene | Do. |
| 4-amino-2,5-dimethoxy-4'-carboxylic acid ethyl-ester-ethylenyl-azobenzene | -4-chlorobenzene | Black-violet. |
| 4-amino-2,5-dimethoxy-2'-carboxylic acid-methyl-ester-4'-nitro-azobenzene | -benzene | Blue-black. |
| Do | -2-methylbenzene | Reddish blue-black. |
| Do | -4-chlorobenzene | Blue-black. |
| 4-amino-2,5-dimethoxy-2'-carboxylic acid-ethylester-4'-nitro-azobenzene | do | Neutral black. |
| 4-amino-2,5-dimethoxy-2'-carboxylic acid-ethylester-5'-nitro-azobenzene | -benzene | Currant. |
| Do | -2, 4-dimethoxy-5-chlorobenzene | Do. |
| 4-amino-2, 5-dimethoxy-2'-nitro-4'-carboxylic acid ethylester-azobenzene | -benzene | Reddish blue-black. |
| Do | -2-methylbenzene | Do. |
| Do | -2-methoxybenzene | Do. |
| Do | -4-chlorobenzene | Do. |
| 4-amino-2, 5-dimethoxy-4'-carboxylic acid-dimethylamide-azobenzene | -2, 5-dimethoxy-4-chlorobenzene | Violetish dark blue. |
| 4-amino-2, 5-dimethoxy-3'-carboxylic acid-dimethylamide-azobenzene | -2-methylbenzene | Dark blue-grey. |
| 4-amino-2, 5-dimethoxy-2'-carboxylic acid diethylamide-ethylenyl-azobenzene | -naphthalene | Dark blue. |
| 4-amino-2, 5-dimethoxy-3'-carboxylic acid-diethylamide-ethylenyl-azobenzene | -benzene | Do. |
| Do | -2-methylbenzene | Do. |
| 4-amino-2, 5-dimethoxy-4'-carboxylic acid-diethylamide-ethylenyl-azobenzene | -benzene | Navy blue. |
| 4-amino-2, 5-dimethoxy-4'-carboxylic acid-diethylamide-methyl-azobenzene | -2, 5-dimethoxy-4-chlorobenzene | Violet. |
| 4-amino-2, 5-dimethoxy-4'-carboxylic acid piperidide azobenzene | do | Black-blue. |
| 4-amino-2, 5-dimethoxy-3'-benzoyl-oxy-azobenzene | -2, 5-dimethoxy-benzene | Currant. |
| 4-amino-2, 5-dimethoxy-4'-benzoyl-oxy-azobenzene | 2-(2', 3'-hydroxynaphthoylamino)-naphthalene | Reddish dark blue. |
| 4-amino-2,5-dimethoxy-2'-methylsulfonyl-methyl-azobenzene | 1-(2', 3'-hydroxynaphthoylamino)-2, 5-dimethoxybenzene | Blue-black. |
| 4-amino-2, 5-dimethoxy-4'-methyl-sulfonylmethyl-azobenzene | -2, 5-dimethoxy-4-chlorobenzene | Currant. |
| 4-amino-2, 5-dimethoxy-3'-ethylsulfonylmethyl-azobenzene | -2, 5-dimethoxybenzene | Do. |
| 4-amino-2, 5-dimethoxy-2'-methylsulfonyl-4'-nitro-azobenzene | -benzene | Neutral black. |
| Do | -2-methylbenzene | Greenish black. |
| Do | -4-chlorobenzene | Neutral black. |
| Do | -2-methyl-4-methoxy-benzene | Greenish black. |
| Do | -2, 5-dimethoxy-4-chlorobenzene | Blue-black. |
| 4-amino-2, 5-dimethoxy-2'-nitro-4'-methylsulfonyl-azobenzene | -benzene | Black. |
| Do | -2-methylbenzene | Do. |
| Do | -2-methoxybenzene | Do. |
| Do | -4-chlorobenzene | Do. |
| 4-amino-2, 5-dimethoxy-3'-sulfonic acid-phenyl-ester-6'-methyl-azobenzene | -2, 5-dimethoxy-4-chlorobenzene | Blue-black. |
| 4-amino-2, 5-dimethoxy-3'-sulfonic acid-phenyl-ester-4'-methyl-azobenzene | do | Deep currant. |
| 4-amino-2, 5-dimethoxy-2'-phenylsulfonyl-oxy-azobenzene | -2, 4-dimethoxy-5-chlorobenzene | Blue-black. |
| Do | -2, 5-dimethoxy-4-chlorobenzene | Do. |
| 4-amino-2, 5-dimethoxy-4'-phenylsulfonyl-oxy-azobenzene | -2, 4-dimethoxy-5-chlorobenzene | Do. |
| 4-amino-2, 5-diethoxy-2'-benzoyl-4'-nitro-azobenzene | -2-methyl-4-methoxy-benzene | Black. |
| 4-amino-2, 5-diethoxy-3'-carboxylic acid-ethylester-5'-nitro-azobenzene | benzene | Reddish black. |
| 4-amino-2, 5-diethoxy-2'-carboxylic acid-ethylester-4'-nitro-azobenzene | do | Neutral black. |
| Do | | Do. |
| Do | -2-methylbenzene | Reddish black. |
| Do | -4-chlorobenzene | Neutral black. |
| 4-amino-2, 5-diethoxy-2'-methylsulfonyl-4'-nitro-azobenzene | -benzene | Do. |
| Do | -4-chlorobenzene | Do. |
| 4-amino-2, 5-diethoxy-2'nitro-4'-methyl-sulfonyl-azobenzene | -benzene | Black. |
| Do | -4-chlorobenzene | Do. |
| 4-amino-1-(para-carboxylic acid-dimethylamide-phenylazo)-naphthalene | -2-methyl-4-chlorobenzene | Black-grey. |
| 4-amino-1-(orthocarboxylic acid-N-methylanilide-phenylazo)-naphthalene | 2, 5-dimethoxy-benzene | Reddish blue-black. |
| Do | -2, 5-dimethoxy-4-chlorobenzene | Do. |
| 4-amino-1-(para-carboxylic acid-N-methylanilide-phenylazo)-naphthalene | -2-methyl-4-chlorobenzene | Deep grey-blue. |

| Diazo component | Coupling component | Shade |
|---|---|---|
| 4-amino-1-(ortho-carboxylic acid diethyl-amide-methyl-oxyphenyl-azo)-naphthalene. | 1-(2',3'-hydroxynaphthoylamino)-<br>-benzene. | Grey-black. |
| Do. | -2, 4-dimethoxy-5-chlorobenzene. | Blue-black. |
| 4-amino-1-(meta-carboxylic acid-diethylamide-methyloxy-phenyl-azo)-naphthalene. | -benzene. | Do. |
| 4-amino-1-(meta-carboxylic acid-diethylamide-methyl-oxy-phenyl-azo)-naphthalene. | -4-methoxybenzene. | Do. |
| 4-amino-1-(para-carboxylic acid-diethylamide-methyl-oxyphenylazo)-naphthalene. | -2-methyl-4-chloro-benzene. | Do. |
| 4-amino-1-(para-carboxylic acid-piperidide-phenylazo)-naphthalene. | do. | Grey-black. |
| 4-amino-1-(para-N-acetyl-methylamino-phenylazo-) naphthalene. | -benzene. | Black-blue. |
| Do. | -2-methyl-4-chlorobenzene. | Grey-black. |
| Do. | -2, 4-dimethoxy-5-chlorobenzene. | Deep currant. |
| Do. | -2, 5-dimethoxy-4-chlorobenzene. | Dark blue. |
| 4-amino-1-(ortho-methyl-sulfonylmethyl-phenylazo)-naphthalene. | -2-methyl-4-methoxy-benzene. | Dull violet. |
| Do. | -2, 4-dimethoxy-5-chlorobenzene. | Dull blue. |
| 4-amino-1-(meta-sulfonic acid-phenylester-phenylazo)-naphthalene. | -2, 5-dimethoxybenzene. | Dark blue-grey. |
| 4-amino-1-(3'-sulfonic acid phenylester-6'-methyl-phenylazo)-naphthalene. | -2-methyl-4-methoxy-benzene. | Grey-blue. |
| 4-amino-1-(ortho-phenyl-sulfonyl-oxyphenylazo)-naphthalene. | -2, 4-dimethoxy-5-chlorobenzene. | Violet-black. |
| Do. | -2, 5-dimethoxy-4-chlorobenzene. | Do. |
| 4-amino-2, 5-dimethoxy-4'-carboxylic acid-propylester-azobenzene. | -naphthalene. | Very dull reddish blue. |
| 4-amino-2, 5-dimethoxy-2', 5'-dicarboxylic acid-methylester-azobenzene. | -2-methylbenzene. | Bordeaux. |
| 4-amino-2, 5-dimethoxy-4'-bromo-2'-carboxylic acid-methylester-azobenzene. | -4-methoxybenzene. | Currant. |
| 4-amino-2-methyl-5-methoxy-2'-bromo-5'-carboxylic acid-methylester-azobenzene. | -2-methyl-4-chlorobenzene. | Bordeaux. |
| 4-amino-5-methyl-2-methoxy-2'-bromo-5'-carboxylic acid-methylester azobenzene. | -2, 5-dimethoxy-4-chlorobenzene. | Do. |
| 4-amino-2-methyl-5-methoxy-4'-nitro-2'-carboxylic acid methylester-azobenzene. | -2-methylbenzene. | Currant-black. |
| 4-amino-2-methyl-5-methoxy-5'-nitro-2'-carboxylic acid-ethylester-azobenzene. | -4-methoxybenzene. | Bordeaux. |
| 4-amino-2-methyl-5-methoxy-3'-N-acetyl-methylamino-azobenzene. | -2-methoxybenzene. | Garnet. |
| 4-amino-2, 5-dimethoxy-3'-N-acetyl-methyl-amino-azobenzene. | -2'-methyl-4-chlorobenzene. | Violet. |
| 4-amino-2-methyl-5-methoxy-4'-N-acetyl-ethylamino-azobenzene. | -3-nitrobenzene. | Currant. |
| 4-amino-2, 5-dimethoxy-N-acetyl-ethylamino-azobenzene. | -naphthalene. | Greenish dull blue. |
| 4-amino-2-methyl-5-methoxy-4'-N-formyl-methylamino-azobenzene. | -3-nitrobenzene. | Currant. |
| 4-amino-2, 5-dimethoxy-4'-N-formyl-methyl-amino-azobenzene. | -naphthalene. | Navy blue. |
| 4-amino-2, 5-dimethoxy-4'-N-phenyl-acetyl-methylamino-azobenzene. | -benzene. | Very deep dark blue. |
| 4-amino-2-methyl-5-methoxy-4'-N-benzoyl-methylamino-azobenzene. | -3-nitrobenzene. | Currant. |
| 4-amino-2-methyl-5-methoxy-4'-N-benzoyl-ethylamino-azobenzene. | -2-methyl-4-chlorobenzene. | Very deep blue-gray. |
| 4-amino-2, 5-dimethoxy-4'-N-benzoyl-ethylamino-azobenzene. | -2-methoxybenzene. | Navy blue. |
| 4-amino-2-methyl-5-methoxy-2'-sulfonic acid diethylamide-methyl-azobenzene. | do. | Bordeaux. |
| 4-amino-2-methyl-5-methoxy-4'-sulfonic acid diethylamide-methyl-azobenzene. | -napthalene. | Do. |
| 4-amino-2, 5-dimethoxy-2'-sulfonic acid-diethylamide-methyl-azobenzene. | do. | Dark blue. |
| 4-amino-2, 5-dimethoxy-4'-sulfonic acid-diethylamide-methyl-azobenzene. | -2-methylbenzene. | Navy blue. |
| 4-amino-1-(2', 5'-dicarboxylic acid-methylester-phenylazo)-napthalene. | -4-methoxybenzene. | Dark blue. |
| 4-amino-1-(3'-carboxylic acid-ethylester-naphthyl-2'-azo)-naphthalene. | -benzene. | Blue-black. |
| 4-amino-1-(2'-bromo-5'-carboxylic acid methylester-phenylazo)-naphthalene. | -4-methoxybenzene. | Violet-brown. |
| 4-amino - 1 - (para-bromo-ortho-carboxylic acid methylester-phenylazo)-napthalene. | -benzene. | Bordeaux. |
| 4-amino-1-(2',5'-dicarboxylic acid-diethylamide-phenylazo)-naphthalene. | 2-(2',3'-hydroxynaphthoylamino) - naphthalene. | Navy blue. |
| 4-amino-1-(para-N-formyl-methylamino-phenylazo)-naphthalene. | do. | Blue-black. |
| 4-amino-1-(para-N-acetyl-ethylamino-phenylazo)-naphthalene. | 1-(2', 3'-hydroxynaphthoylamino)-<br>-2-methyl-4-chlorobenzene. | Dull greenish blue. |
| 4-amino-1-(para-N-benzoyl-methylamino-phenylazo-) naphthalene. | -benzene. | Deep grey-blue. |
| 4-amino-1-(para-N-benzoyl-ethylamino-phenylazo)-naphthalene. | -2-methyl-4-chlorobenzene. | Currant. |
| 4-amino-1-(para-sulfonic acid-diethylamide-methyl-phenylazo)-naphthalene. | do. | Blue-black. |
| 4-amino-1-(ortho-sulfonic acid - diethylamide- methyl -phenylazo)-naphthalene. | do. | Very deep blue. |
| 4-amino-2, 5-dimethoxy-2'-phenoxy-5'-acetyl-azobenzene. | -2-methoxybenzene. | Reddish black. |
| 4-amino-2-methyl-5-methoxy-2'-nitro-4'-benzoyl-azobenzene. | -benzene. | Black. |
| 4-amino-2, 5-dimethoxy-2'-nitro-4'-benzoyl-azobenzene. | -2-methoxybenzene. | Reddish black. |
| 4-amino-2, 5-diethoxy-2'-nitro-4'-benzoyl-azobenzene. | -4-chlorobenzene. | Greenish black. |
| 4-amino-2, 5-dimethoxy-2'-chloro-5'-benzoyl-azobenzene. | -benzene. | Black. |
| 4-amino-2, 5-dimethoxy-2'-phenoxy-5'-carboxylic acid-ethylester-azobenzene. | -2-methoxybenzene. | Reddish black. |
| 4-amino-2, 5-dimethoxy-4'-chloro-2'-carboxylic acid-methylester-azobenzene. | -benzene. | Black. |
| 4-amino-2, 5-diethoxy-4'-chloro-2'-carboxylic acid-methylester-azobenzene. | -4-chlorobenzene. | Do. |
| 4-amino-2, 5-dimethoxy-3'-chloro-5'-carboxylic acid-ethylester-azobenzene. | -2-methoxybenzene. | Do. |
| 4-amino-2, 5-diethoxy-3'-chloro-5'-carboxylic acid-ethylester-azobenzene. | -4-chlorobenzene. | Deep black. |
| 4-amino-2, 5-dimethoxy-3'-chloro-4'-carboxylic acid-methylester-azobenzene. | -benzene. | Blue-black. |
| 4-amino-2, 5-dimethoxy-5'-chloro-2'-carboxylic acid methylester-azobenzene. | do. | Reddish black. |
| 4-amino-2, 5-dimethoxy-4'-chloro-3'-carboxylic acid-ethylester-azobenzene. | do. | Blue-black. |
| 4-amino-2, 5-dimethoxy-2'-chloro-5'-carboxylic acid-ethylester-azobenzene. | do. | Black-blue. |
| 4-amino-2, 5-dimethoxy-2'-chloro-5'-carboxylic acid-methylester-azobenzene. | do. | Blue-black. |
| 4-amino-2, 5-dimethoxy-4'-chloro-2'-carboxylic acid-ethylester-azobenzene. | do. | Do. |
| 4-amino-2, 5-dimethoxy-3'-nitro-5'-carboxylic acid-ethylester-azobenzene. | -2-methylbenzene. | Black. |
| 4-amino-2, 5-dimethoxy-2'-phenoxy-5'-carboxylic acid-diethylamide-azobenzene. | -benzene. | Reddish black. |
| 4-amino-2, 5-dimethoxy-2',4'-bis-ethylsulfonyl-azobenzene. | -2-methylbenzene. | Neutral black. |
| 4-amino-2, 5-diethoxy-2'-ethylsulfonyl-5'-trifluoro-methyl-azobenzene. | -benzene. | Reddish black. |
| 4-amino-2, 5-dimethoxy-4'-nitro-2'-sulfonic acid phenylester-azobenzene. | do. | Do. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:

1. The water-insoluble azo-dyestuffs of the following general formula:

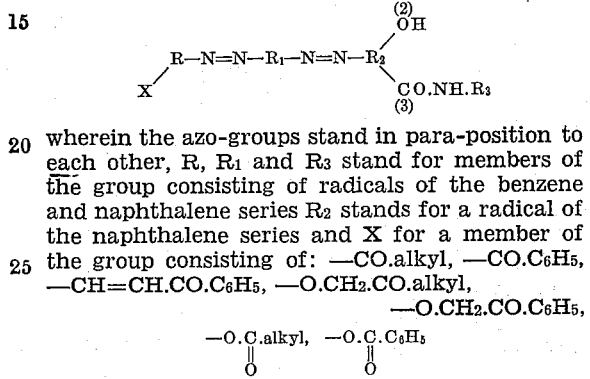

wherein the azo-groups stand in para-position to each other, R, $R_1$ and $R_3$ stand for members of the group consisting of radicals of the benzene and naphthalene series $R_2$ stands for a radical of the naphthalene series and X for a member of the group consisting of: —CO.alkyl, —CO.$C_6H_5$, —CH=CH.CO.$C_6H_5$, —O.$CH_2$.CO.alkyl, —O.$CH_2$.CO.$C_6H_5$, —O.C.alkyl, —O.C.$C_6H_5$
   ‖         ‖
   O         O COO.alkyl, —COO.$C_6H_5$, —$CH_2$.COO.alkyl, —CH=CH.COO.alkyl,

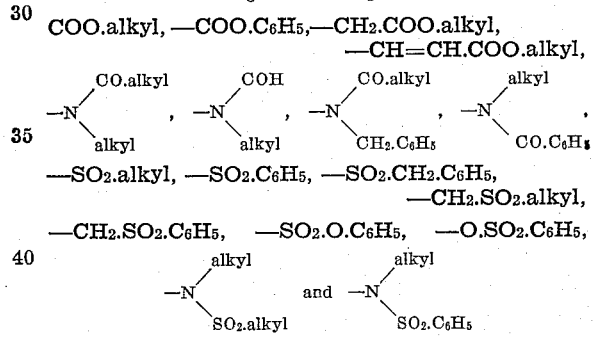

—$SO_2$.alkyl, —$SO_2.C_6H_5$, —$SO_2.CH_2.C_6H_5$, —$CH_2.SO_2$.alkyl, —$CH_2.SO_2.C_6H_5$, —$SO_2.O.C_6H_5$, —O.$SO_2.C_6H_5$,

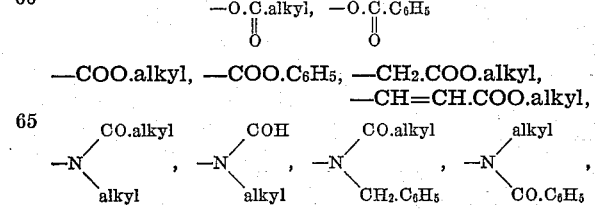

yielding, when produced on the fiber, garnet to black dyeings of good fastness properties.

2. The water-insoluble azo-dyestuffs of the following general formula:

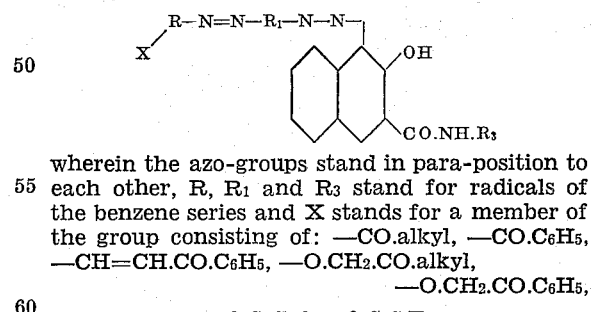

wherein the azo-groups stand in para-position to each other, R, $R_1$ and $R_3$ stand for radicals of the benzene series and X stands for a member of the group consisting of: —CO.alkyl, —CO.$C_6H_5$, —CH=CH.CO.$C_6H_5$, —O.$CH_2$.CO.alkyl, —O.$CH_2$.CO.$C_6H_5$, —O.C.alkyl, —O.C.$C_6H_5$
   ‖         ‖
   O         O —COO.alkyl, —COO.$C_6H_5$, —$CH_2$.COO.alkyl, —CH=CH.COO.alkyl,

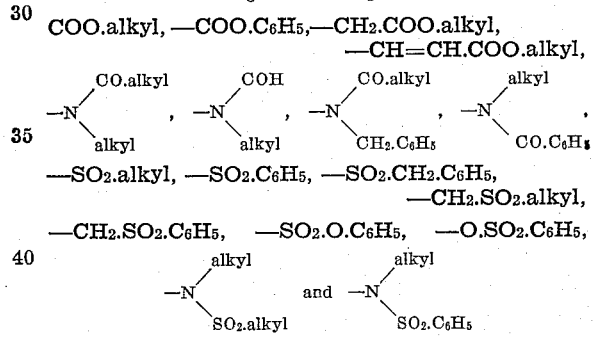

—$SO_2$.alkyl, —$SO_2.C_6H_5$, —$SO_2.CH_2.C_6H_5$, —$CH_2.SO_2$.alkyl, —$CH_2.SO_2.C_6H_5$, —$SO_2.O.C_6H_5$, —O.$SO_2.C_6H_5$,

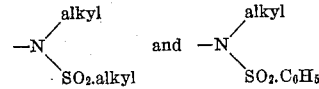

yielding, when produced on the fiber, garnet to black dyeings of good fastness properties.

3. The water-insoluble azo-dyestuff of the following formula:

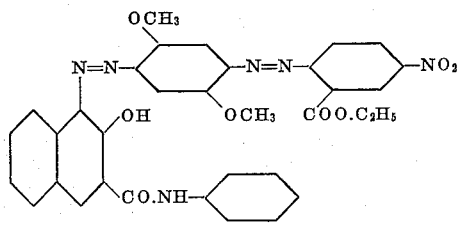

yielding, when produced on the fiber, a deep black dyeing of very good fastness to light, chlorine and ironing.

4. The water-insoluble azo-dyestuff of the following formula:

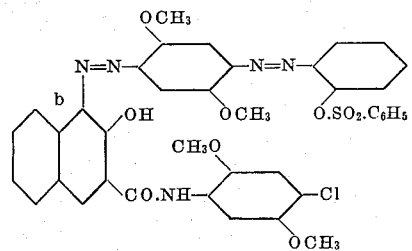

yielding, when produced on the fiber, a blue-black dyeing of very good fastness to light and to chlorine.

5. Fiber dyed with the water-insoluble azo-dyestuffs as claimed in claim 1.

6. Fiber dyed with the water-insoluble azo-dyestuffs as claimed in claim 2.

7. Fiber dyed with the water-insoluble azo-dyestuff as claimed in claim 3.

8. Fiber dyed with the water-insoluble azo-dyestuff as claimed in claim 4.

9. The water-insoluble azo-dyestuff of the following formula:

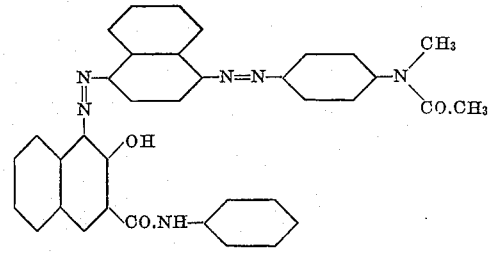

yielding, when produced on the fiber, a black-blue dyeing of very good fastness to light and to chlorine.

10. Fiber dyed with the water-insoluble azo-dyestuff as claimed in claim 9.

ERWIN THOMA.
WILHELM SEIDENFADEN.